A. C. ILIFFE.
AUTOMATIC STOP FOR TALKING MACHINES.
APPLICATION FILED JAN. 26, 1920.
1,408,740.
Patented Mar. 7, 1922.
2 SHEETS—SHEET 1.
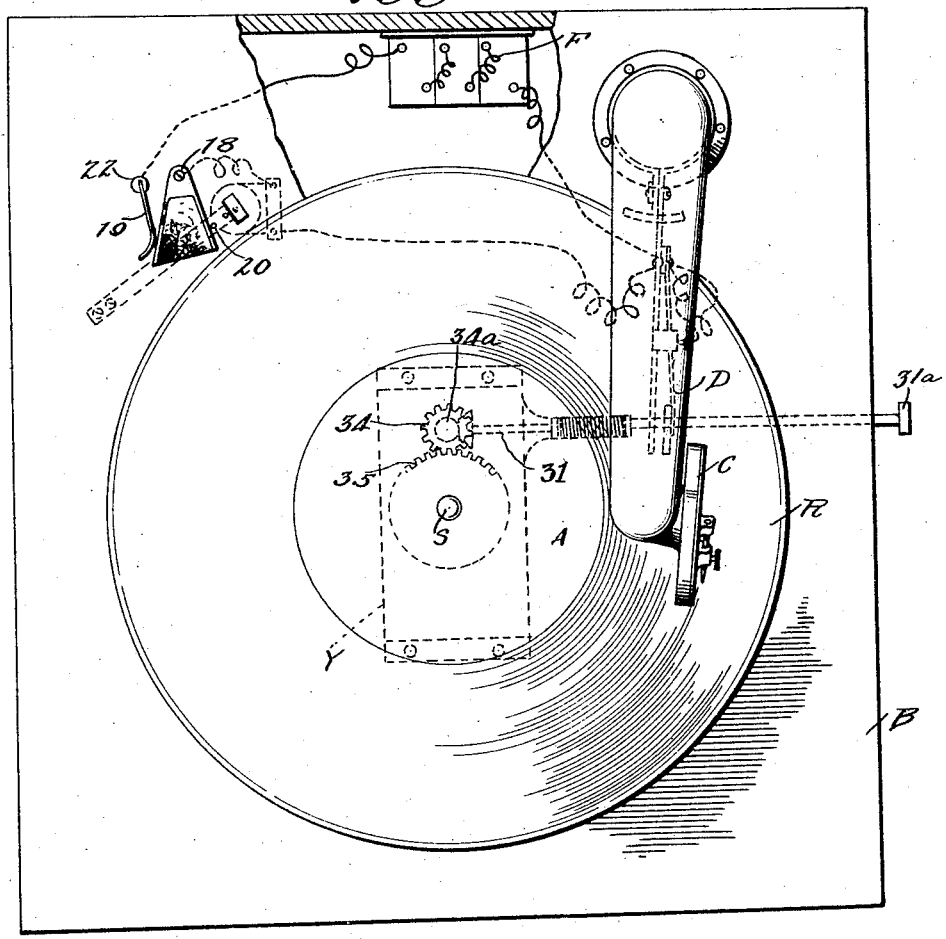
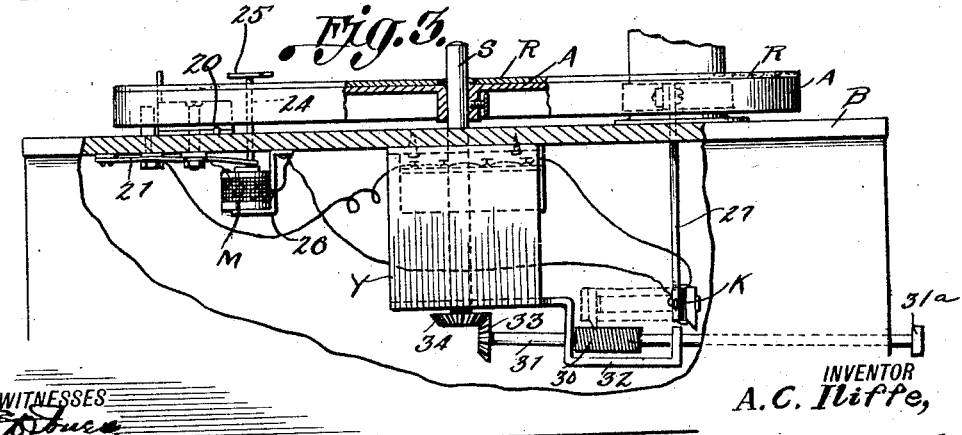
INVENTOR
A. C. Iliffe,

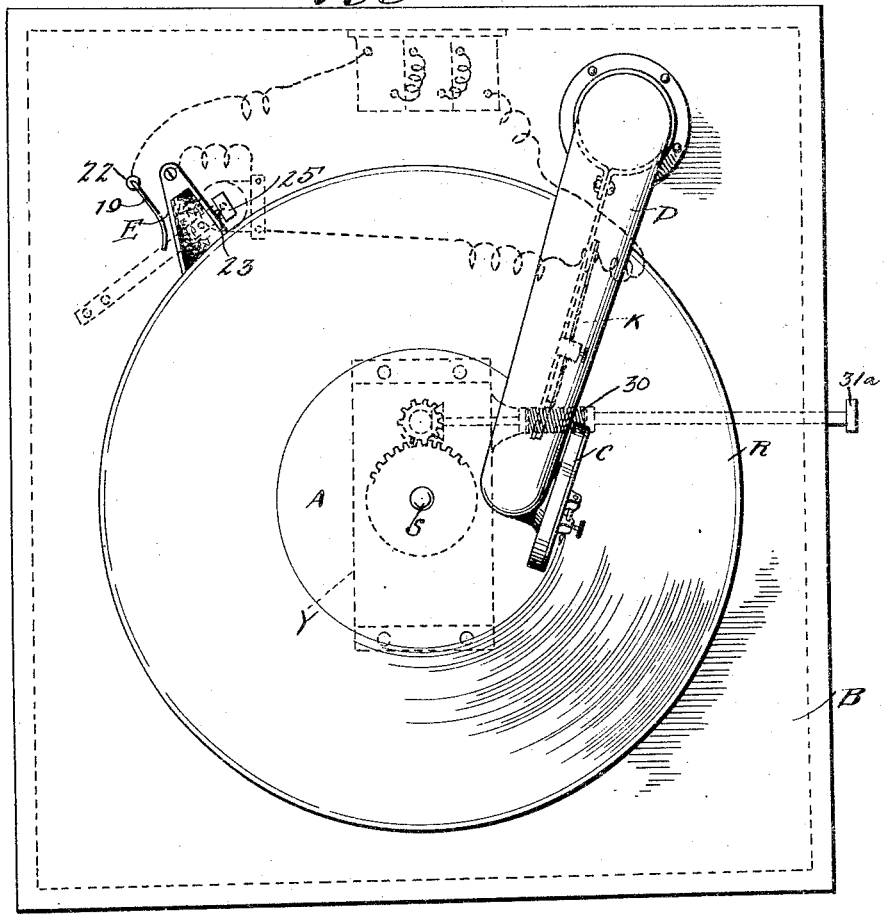
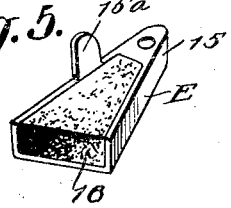
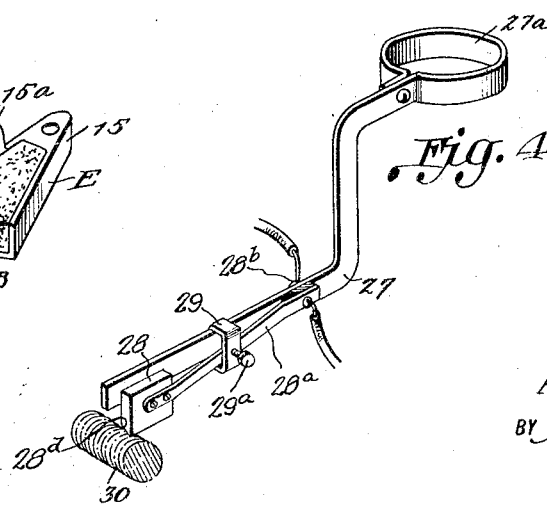

UNITED STATES PATENT OFFICE.

ARTHUR CLEVELAND ILIFFE, OF HAILEYBURY, ONTARIO, CANADA.

AUTOMATIC STOP FOR TALKING MACHINES.

1,408,740.　　　　　Specification of Letters Patent.　　Patented Mar. 7, 1922.

Application filed January 26, 1920. Serial No. 354,308.

*To all whom it may concern:*

Be it known that I, ARTHUR CLEVELAND ILIFFE, a subject of the King of Great Britain, and a resident of Haileybury, in the Province of Ontario, in the Dominion of Canada, have invented certain new and useful Improvements in Automatic Stops for Talking Machines, of which the following is a specification.

My invention relates to an apparatus for automatically stopping a talking machine when the stylus or reproducer has reached the inner end of the sound groove of the record, a purpose of my invention being the provision of a simple and efficient apparatus of this character which is electrically controlled in such manner that the amount of current consumed is negligible.

It is also a purpose of my invention to provide a stopping apparatus which is adjustable to effect the automatic stopping of a talking machine irrespective of the diameter of the record, and furthermore an apparatus which may be operated manually should it be desired to temporarily dispense with the automatic feature.

I will describe one form of stopping apparatus embodying my invention, and will then point out the novel features thereof in claims.

In the accompanying drawings:—

Figure 1 is a view, showing in top plan one form of talking machine having applied thereto one form of stopping apparatus embodying my invention in the inactive or starting position;

Figure 2 is a view similar to Figure 1, showing the apparatus in an inactive or final position;

Figure 3 is a view, showing in side elevation the talking machine and apparatus shown in the preceding views, certain parts being broken away and others shown in section for the purpose of clearly illustrating certain details of the invention; and Figures 4 and 5 are detail views of the apparatus shown in the preceding views.

Referring specifically to the drawings, and particularly to Figures 1, 2 and 3, I have herein shown a conventional form of talking machine which in the present instance is a gramophone, the same including a box B having a yoke Y therein which supports the mechanism for driving a shaft S carrying the usual form of turn-table A. The drawings show a record R mounted upon the turn-table A and across which is adapted to work a conventional form of stylus C fixed to the end of a tone arm D.

The stopping apparatus forming the subject-matter of my invention comprises a braking mechanism including a shoe E which is movable to engage the periphery of the turn-table A and to thereby prevent rotation of the latter. As illustrated to advantage in Figure 5, the shoe E comprises a metallic casing 15 which is preferably of triangular formation and is recessed at its upper side to provide a pocket for receiving a block 16 of rubber or any other suitable material which projects beyond the working end of the casing so as to contact with the periphery of the turn-table when the shoe is in active position. As shown in Figure 1, the shoe E is pivoted at the smaller end of the casing on a bolt 18 which is secured within the upper wall of the box B, as clearly shown in Figure 3 so that the shoe is capable of horizontal swinging movement about the bolt as a center. The shoe E is capable of occupying an active position in which the block engages the periphery of the turn-table, as clearly shown in Figure 2, and an inactive position wherein the block is moved free of the turn-table so that rotation of the latter is unrestricted, as shown in Figure 1. The shoe is held in the inactive position and against the tension of a spring arm 19 by means of a pin 20 carried by a spring arm 21. As shown in Figure 3, the spring arm 21 is secured at one end to the under side of the top wall of the box B, with the pin 20 formed integral with the arm at a point adjacent its free end and slidably fitted within a suitable opening provided in the box B. In the normal position of the spring arm 21, the pin 20 projects upwardly sufficiently to engage the shoe E so as to prevent movement of the latter from the inactive to the active position. However, when the free end of the spring 21 is lowered to the position shown in Figure 3, the pin 20 is retracted so as to disengage the shoe and to thereby allow the same to move to the active position under the action of the spring arm 19. The arm 19 is mounted in a post 22 in a manner to force the shoe from the inactive to the active position but to disengage the same as it reaches its active position. As shown in Figure 5, the casing 15 is formed with a lug 15ª against which the spring arm 19 is adapted to bear in the inactive position of the shoe but disengages the same when the shoe is in the active position. As shown in Figure 2, the active position of the shoe E is determined by a stop 23 secured to the upper side of the top wall of the box B.

In order to lower the spring arm 21 for effecting a retraction of the pin 20, I provide both manually operated means and automatically controlled electrical means, this arbitrary control being primarily designed to permit the starting of the machine at the will of the operator without the addition of any further means to this end. The manually controlled means consists of a rod 24 which is slidable through the top wall of the box B at a point directly above the free end of the spring 21 so that the lower end of the rod contacts with the latter. The upper end of the rod 24 is formed with a handle 25 for depressing the rod and thereby lowering the free end of the spring arm 21. From the foregoing description, it will be understood that when the free end of the arm 21 is lowered the pin 20 is retracted so that the shoe E is free to move to the active position under the action of the spring 19.

The electrical means for lowering the spring arm 21 comprises an electromagnet M supported at the under side of the top wall of the box B by a bracket 26 in such manner that the core of the magnet is disposed directly below the free end of the spring arm 21. From this arrangement, it will be seen that when the magnet M is energized, the free end of the spring arm 21 is lowered to effect the retraction of the pin 20. The magnet M is provided with a circuit including a set of batteries F conveniently positioned within the box B and a circuit closer designated generally at K which is supported and actuated by the tone arm D of the gramophone. As illustrated to advantage in Fig. 4, the circuit closer K comprises an arm 27 which is bent upwardly intermediate its ends with its rear end terminating in a ring 27ª that is adapted to embrace the rear end of the tone arm D. The top wall of the box B is suitably slotted, as indicated in dash lines in Figure 1 to receive the vertical portion of the arm 27 and to permit lateral movement of such arm as it is carried along by the tone arm. The arm 27 carries a block 28 formed of conducting material which is flexibly supported thereon by a leaf spring 28ª pivotally connected to the arm as at 28ᵇ to allow of the vertical movement thereof and consequently the block 28. This vertical movement of the block 28 is controlled within limits by a yoke 29 formed on the arm 27.

As shown in Figure 4, the spring 28ª and arm 27 are insulated from each other so that current traverses the two only when the block 28 engages the arm 27. As previously stated, the ring 27ª embraces the rear end of the tone arm D. It is to be particularly noted that the ring embraces the tone arm at a point above the pivotal support of the latter so that when raising the sound box from the record a lifting of the arm 27 is effected which in consequence lifts the block 28 and moves the same out of contact with the worm 30. This allows the free and unrestricted movement of the tone arm back to its starting position.

The yoke 29 is provided with a set screw 29ª that engages the spring 28ª and when adjusted regulates the position of the block 28 with respect to the arm 27, it being understood that the spring normally biases the block away from the arm. The adjustment of the block 28 is comparatively small as it is to allow for the variance in movement of the tone arm in playing imperfectly centered records.

As shown in Figure 4, the lower edge of the block 28 is provided with a beveled lip 28ᵈ which is adapted to engage the threads of a rotatable worm 30, in such manner that a lateral movement of the arm is effected in one direction or the other dependent upon the direction of rotation of the worm. The formation of the threads of the worm 30 and the lip 28ᵈ are such that the latter can be easily pulled over the threads when the block is being moved toward the center of the record so that should the tone arm be moving faster than the worm is propelling the block, the latter will slip transversely of the threads and thus move together with the tone arm. As shown in Figure 3, the worm 30 is formed on one end of a shaft 31 journaled in an arm 32 formed on the yoke Y through which the shaft S extends. One end of the shaft 31 is provided with a beveled gear 33 which meshes with a similar gear 34 fixed to a stub shaft 34ª. The gear 34 meshes with a relatively large gear 35 fixed to the lower end of the shaft S, as clearly shown in Figure 1. From this arrangement it will be seen that upon rotation of shaft S a similar movement is imparted to shaft 31 thus causing the worm 30 to move in such direction that a feeding of the arm 28ª to the left is effected, carrying with it the block 28. The worm 30 is of such a length that the block 28 does not engage the same during a major portion of the movement of the tone arm but just before the tone arm reaches the end of the record, it being understood that the worm is sufficiently long to allow for the variance in diameter of the records. To cause the block 28 to smoothly engage the worm 30, the latter is inclined downwardly from its inner end so that its outer end is disposed below the plane in which the beveled edge 28$^d$ moves thus causing the latter to gradually mesh with the threads of the worm.

As shown in Figure 3, the shaft 31 is movable longitudinally within the arm 32 so as to cause the gear 33 to mesh with the gear 34 when in one extreme position and to unmesh with the same when in another extreme position. The shaft 31 is extended to a point exteriorly of the casing D where it is provided with a handle 31$^a$ which is adapted to be gripped in the manual shifting of the shaft. By this arrangement the feeding mechanism may be rendered inoperative and conversely rendered operative at the will of the operator.

The operation of the apparatus is as follows:

With the brake shoe E in the inactive position, as shown in Figure 1, and the tone arm D travelling across the record R under the action of the needle working within the record groove, the arm 27 and block 28 are spaced apart so that the circuit for the magnet M is disrupted and the magnet itself deenergized. The circuit for the magnet M is obvious from the drawings, and therefore a tracing of the same is thought to be unnecessary. As the tone arm D travels inwardly toward the axis of the disk, the block 28 engages the worm 30 and is thereby uniformly fed in the same direction as the tone arm, in the manner previously described, but in no event faster than the needle travels toward the center of the record. As the needle of the stylus C reaches the end of the record groove, the tone arm and consequently the contact arm 27 come to rest, but because of the continued rotation of the worm 30, the block 28 continues to be moved in the direction of the arm 27 until it finally contacts with the same thereby completing the circuit and effecting an energization of the magnet M. As soon as the magnet M is energized the free end of the spring arm 21 is lowered, thereby moving the pin 20 out of the path of the shoe E and allowing the same to move to the active position under the action of the spring arm 19. As the shoe E moves to the active position, the arm 19 disengages the same as has been previously described, and as will be seen from the examination of Figure 1 the arm 19 is included in the circuit of the magnet M so that in the active position of the shoe as shown in Figure 2, the circuit for the magnet M is almost instantly disrupted after the closing of the same by the circuit closer K. It will therefore be clear that the magnet M is energized only momentarily so that only a small amount of current is consumed in the moving of the shoe to the active position.

It is to be particularly noted that because of the pivotal mounting of the shoe E with respect to the propelling of the turn table R, when the shoe is moved to stopping position a compression of the rubber 16 is effected under the action of the rotating turn table so as to effect a positive stopping of the latter.

Although I have herein shown and described only one form of stopping apparatus embodying my invention, it is to be understood that various changes and modifications may be made herein without departing from the spirit of the invention or the spirit and scope of the appended claims.

Having thus described my invention, I claim:

1. A stopping mechanism for talking machines comprising a brake shoe capable of occupying active and inactive positions, a spring for biasing said shoe to the active position which is arranged to disengage said shoe when the latter has reached its active position, a pin for holding said shoe in the inactive position, electro-magnetic means for actuating said pin to release said shoe, a circuit including said means, said spring and said shoe, and a circuit controller adapted to be operated by the tone arm of the talking machine for closing said circuit at a predetermined time to energize said means and release said shoe whereby said circuit is disrupted by the disengagement of said spring and said shoe.

2. A stopping mechanism for talking machines comprising a brake shoe capable of occupying active and inactive positions, a spring for biasing said shoe to the active position which is arranged to disengage said shoe when the latter has reached its active position, a pin for holding said shoe in the inactive position, electro-magnetic means for actuating said pin to release said shoe, a circuit including said means, said spring and said shoe, a circuit controller adapted to be carried by and movable with the tone arm of a talking machine, and screw threaded means adapted to be operated by the motor of the talking machine for closing said circuit controller at a predetermined time.

3. A stopping mechanism for talking machines comprising a brake shoe capable of occupying active and inactive positions, a spring for biasing said shoe to the active position which is arranged to disengage said shoe when the latter has reached its active position, a pin for holding said shoe in the inactive position, electro-magnetic means for actuating said pin to release said shoe, a circuit including said means, said spring and said shoe, a circuit controller comprising an arm adapted to be secured to the tone arm of a talking machine and movable therewith, a second arm carried by the first arm, means for adjusting the position of the second arm with respect to the first arm, and screw threaded means engageable with the second arm for effecting contact between the two arms for closing said circuit.

4. A stopping mechanism for talking machines comprising a brake shoe, means for biasing said brake shoe to an active position, means for locking said shoe in an inactive position against said biasing means, electro-responsive means for actuating the last means, a circuit for said electro-responsive means, a circuit controller for said circuit comprising an arm adapted to be secured to the tone arm of a talking machine and movable therewith, a second arm insulated from the first arm, screw-threaded means adapted to be operated by the motor of the talking machine and engageable with the second arm for feeding the arms into engagement with each other to effect a closing of the arms and closing said circuit, and adjustable means for varying the instant at which said arms are closed.

ARTHUR CLEVELAND ILIFFE.